United States Patent [19]

Carter et al.

[11] Patent Number: 4,505,508
[45] Date of Patent: Mar. 19, 1985

[54] TRUCK BED LINER

[76] Inventors: Mark S. Carter, 16792 Talisman La., Apt. 319, Huntington Beach, Calif. 92649; Jim Ritter, 5241 E. Willow St., Long Beach, Calif. 90815

[21] Appl. No.: 475,600

[22] Filed: Mar. 15, 1983

[51] Int. Cl.³ .............................................. B62D 33/02
[52] U.S. Cl. .................... 296/39 R; 105/423; 224/42.42
[58] Field of Search .......... 296/39 R, 39 A; 105/423, 409; 52/222; 224/42.42 R; 220/403, 410

[56] References Cited

U.S. PATENT DOCUMENTS

| | | | |
|---|---|---|---|
| 3,409,326 | 11/1968 | Kerner | 296/153 |
| 3,751,103 | 8/1973 | Robertson | 296/24 R |
| 4,162,098 | 7/1979 | Richardson | 296/39 R |
| 4,245,863 | 1/1981 | Carter | 296/39 R |
| 4,319,528 | 3/1982 | Gutridge et al. | 105/423 |
| 4,333,678 | 6/1982 | Munoz et al. | 296/39 R |
| 4,336,963 | 6/1982 | Nix et al. | 296/39 R |

Primary Examiner—Robert B. Reeves
Assistant Examiner—Dennis H. Pedder
Attorney, Agent, or Firm—Gausewitz, Carr, Rothenberg & Edwards

[57] ABSTRACT

A kit for lining the inside of the bed of a pickup truck is made of plywood liner sections, including side panel liner sheets that are outwardly bowed and captured between the truck bed floor and an inwardly extending shoulder of the upper rail of the side panel. The side panel liner sheets are held in outwardly bowed position to more closely conform to the outward curvature of the truck side panels by wheel well liner boxes that cover the wheel wells. The boxes are forced outwardly against intermediate sections of the side panel liner sheets and fixed to the wheel wells. Tail box liner sections, also of plywood, cover the truck body tail light boxes, are fixed to the tail light boxes, and hold the rear edges of the side panel liner sheets in position.

13 Claims, 7 Drawing Figures

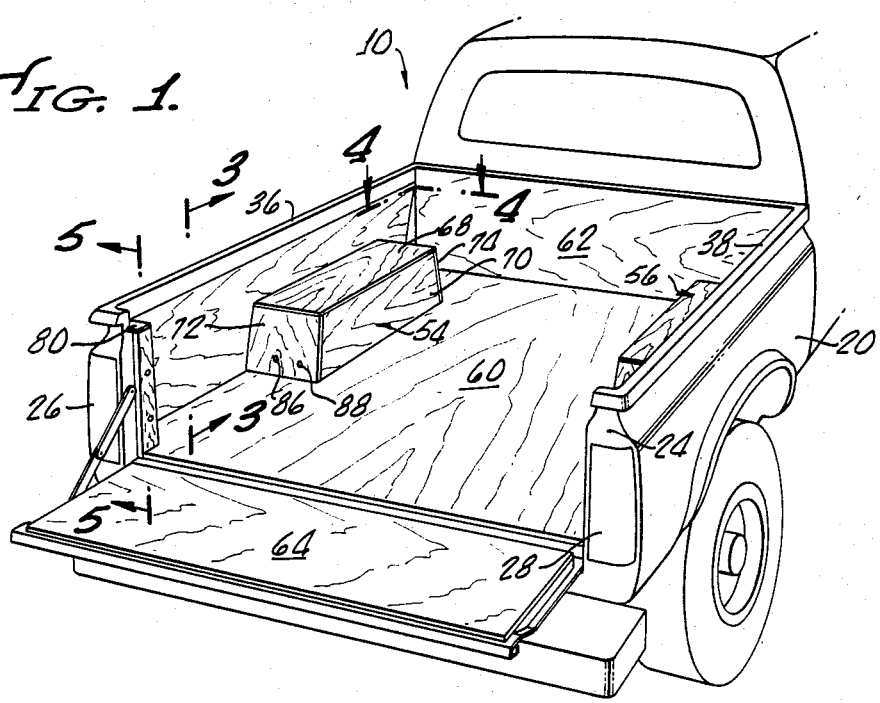
Fig. 1.
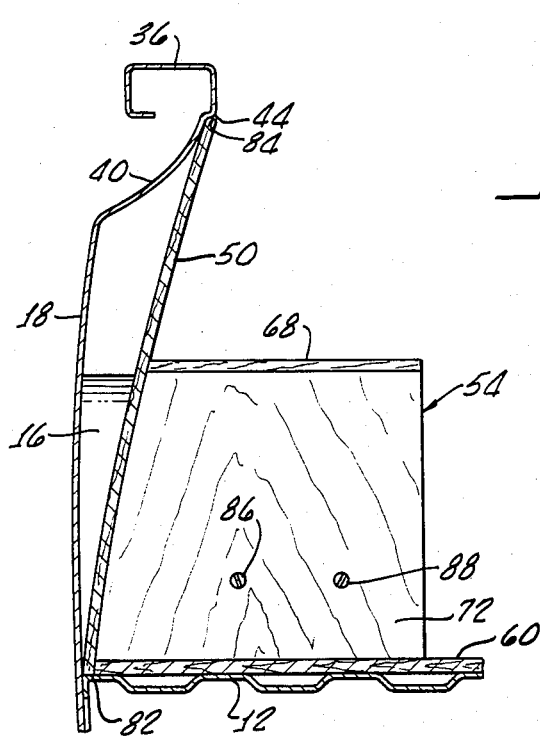
Fig. 3.
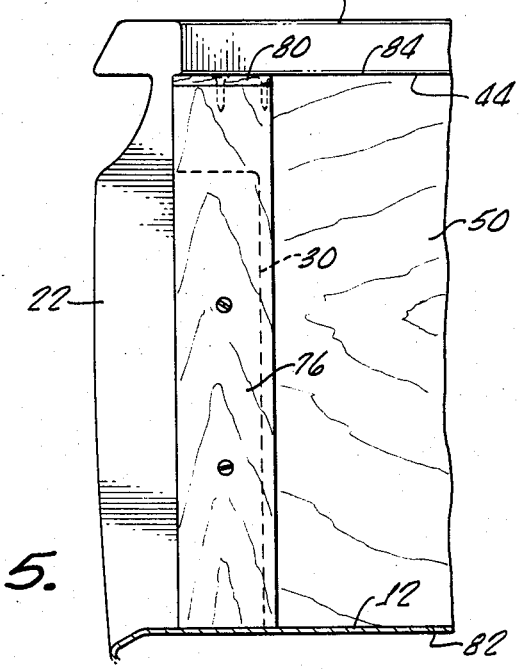
Fig. 4.
Fig. 5.

TRUCK BED LINER

BACKGROUND OF THE INVENTION

The present invention relates to a protective liner assembly and kit for the bed of a pickup truck and more particularly concerns such an assembly and kit that are simply made and easily installed.

Different types of protective liners for the body of pickup trucks have been suggested, including arrangements shown in the U.S. patents to Robertson (U.S. Pat. No. 3,751,103), Richardson (U.S. Pat. No. 4,162,098), Carter (U.S. Pat. No. 4,245,863), and Munos et al (4,333,678). Although the arrangements shown in the prior art may be effective for protecting the truck body, they involve generally high degrees of complex fabrication, costly materials, and specific fastening and connection devices. They are also difficult to assemble and connect or even more difficult to detach from the truck body, when required for replacement or repair. Particularly severe problems are found in connection with lining of those truck bodies in which a side panel is made of a single metallic sheet. Screws or bolts employed to hold protective liners to such side panels significantly detract from the appearance of the truck body and require holes in the side panels which are more prone to rust and, moreover, are unsightly when the liner is removed.

Accordingly, it is an object of the present invention to provide an improved pickup truck body liner assembly that avoids or minimizes above-mentioned problems.

SUMMARY OF THE INVENTION

In carrying out principles of the present invention in accordance with a preferred embodiment thereof, a protective assembly for a pickup truck body comprises a side panel liner sheet extending along one of the sidewalls and having a notch that fits over the wheel well, and means arranged to be fixedly secured to the wheel well or to the truck body tail box for pressing an intermediate area of the liner sheet toward one sidewall. More specifically, the liner sheet is made of a resilient material and has a height slightly greater than the distance between an inward shoulder on an upper rail of the truck body side panel and a liner bottom bearing adjacent a junction of the floor and side panel, whereby a wheel well liner box arranged to fit over the wheel well and to be secured thereto presses against an intermediate portion of the liner sheet and bows it outwardly. The liner sheet more closely conforms to the outwardly curved side panel of the truck body and, moreover, is snugly captured between the shoulder of the side panel rail and the truck body floor or bottom bearing.

BRIEF DESCRIPTION OF THE DRAWINGS

FIG. 1 is a perspective view of a pickup truck body having a protective liner assembly embodying principles of the present invention;

FIG. 3 is a section taken on lines 3—3 of FIG. 1;

FIG. 4 is a section taken on lines 4—4 of FIG. 1;

FIG. 5 is a section taken on lines 5—5 of FIG. 1; and

DETAILED DESCRIPTION OF THE INVENTION

Figure 2:
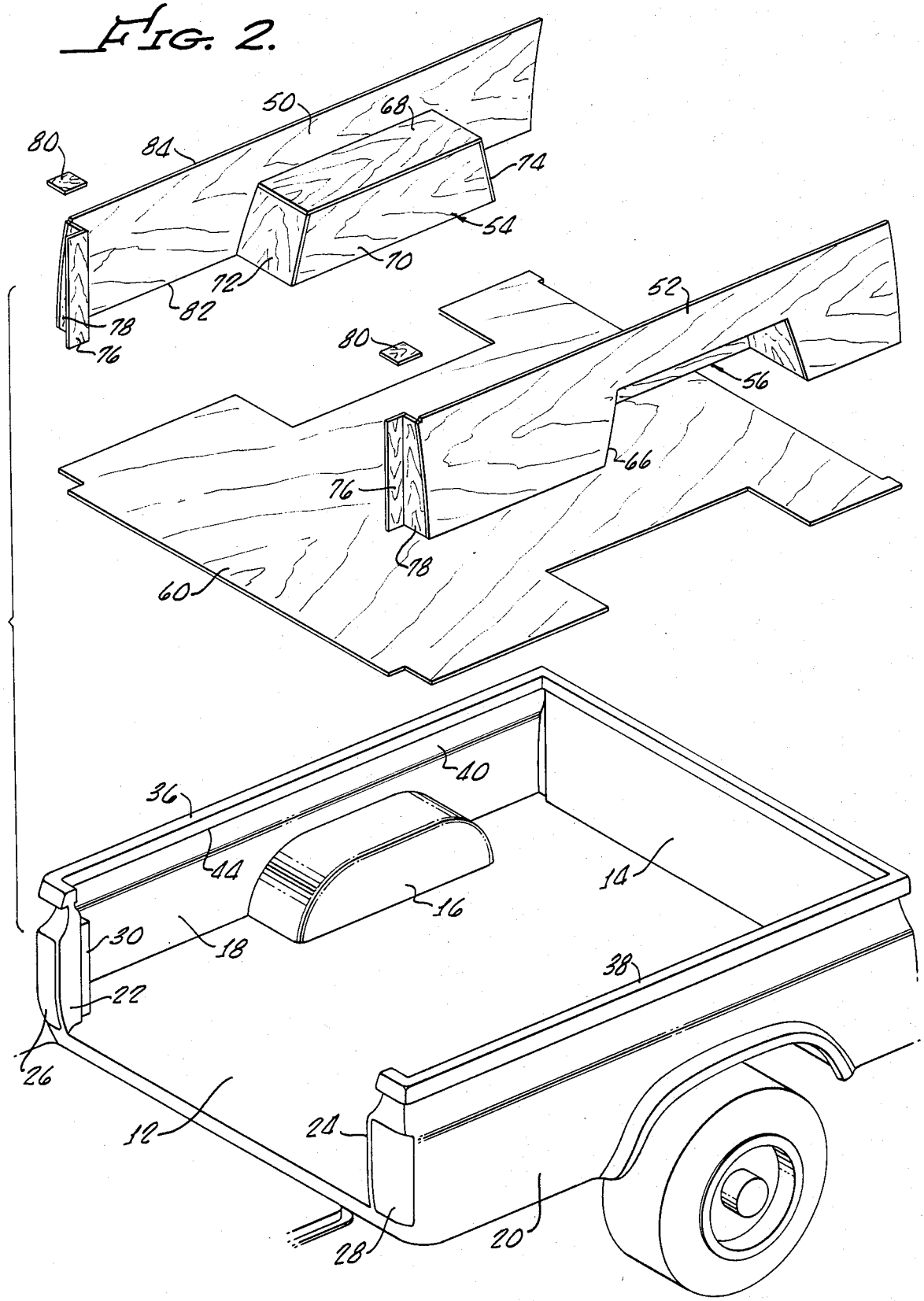
FIG. 2 is a view of several parts of the protective assembly in exploded relation with respect to the truck body.

Referring to the drawings, and to FIGS. 1 and 2 in particular, the body of a pickup truck 10 includes a floor 12, a front wall 14, a pair of wheel wells of which one is illustrated at 16 in FIG. 2, and side panels 18, 20 terminated at their rear portions by inwardly extending tail pieces 22, 24 having tail lights 26, 28 carried in tail boxes, such as tail box 30. Some trucks may have the tail lights below the floor, eliminating the use of tail boxes. Side panels 18 and 20 are made of a single thickness of sheet metal with a stiffened upper edge formed by an upper rail 36, 38 of generally box cross-section joined to the main section of the tail panel by an upwardly and inwardly extending transition section 40 (see FIG. 3). The side panels are outwardly bowed, having a concave inner surface as illustrated in the drawing, and the transition section 40 extends from an upper part of the bowed section of the side panel 18 in an inward and upwardly directed curve to the top rail 36 with which it is integrally joined to form an inwardly extending and downwardly facing shoulder 44.

As best seen in FIG. 4, front wall 14 joins the side panels 18, 20 by means of a connecting section 46 which cooperates with the front wall and side panel to form a rearwardly facing recess 48 at the upper portion of the side panel and front wall.

A protective assembly kit embodying principles of the present invention includes side panel liner sheets 50, 52, wheel well liner boxes 54, 56, floor liner 60, front wall liner 62, and tail gate liner 64. Each of the parts is made of a relatively rigid, self-supporting and resilient sheet material, such as, for example, three eighths or one half inch thick exterior plywood or a suitable plastic. Side panel liner sheets 50, 52 (preferably three eights plywood) have cutout portions or notches, as indicated at 66 for liner sheet 52, which receive the wheel wells when the liner sheet is positioned adjacent the side panel. The wheel well liner boxes are most conveniently made of four sheets of one half inch plywood 68, 70, 72 and 74, being open at the outer side and bottom, and of a generally trapezoidal configuration to closely fit over and protect the wheel wells. The tail box liners are most simply made of a pair of plywood strips 76, 78 secured at right angles to one another and covered with a plywood cap 80. The various parts of the tail box liner and the wheel well liner boxes are secured to one another by nails, screws, glue, or some combination of these. For a truck having tail lights below the floor and no tail boxes, the tail box liner will include only the strip 78 which is attached to the truck bed by screws or equivalent fasteners.

The truck body is protected by the assembly of liner elements, which are first formed individually in the configuration illustrated in the exploded view of FIG. 2. Preferably, the side panel liner sheets 50, 52 have lengths substantially equal to the distance from the forward end of recess 48 to the forwardly facing inner surface of the tail piece 22 and have a height, as measured from the side panel liner sheet lower edge 82 to upper edge 84, that is sightly greater than the straight line distance from a liner bottom edge bearing adjacent the junction of the truck body floor 12 and side panel 18 to be downwardly facing surface of the inward shoulder 44 of the top rail 36.

Figure 6:
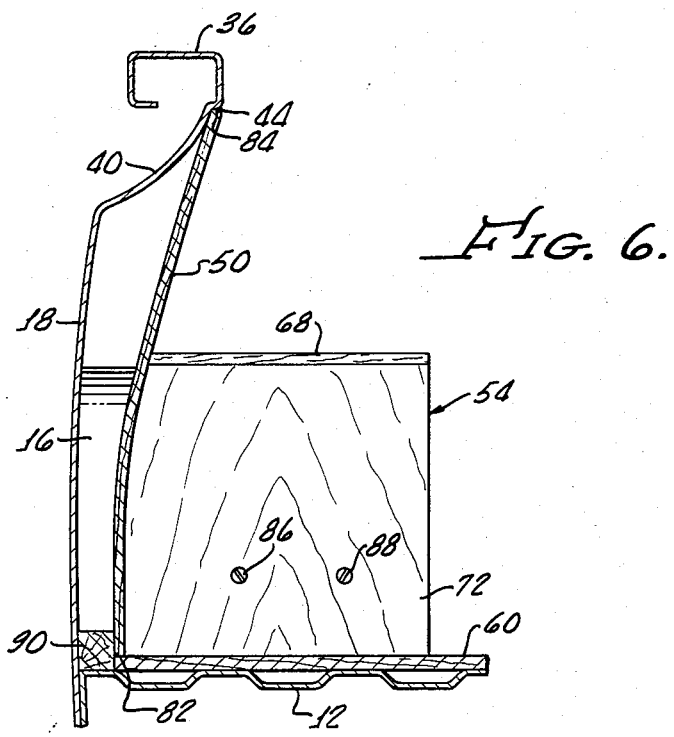
FIGS. 6 and 7 illustrate modified forms of the liner assembly.

In the arrangement shown in FIG. 3, the bottom of the side panel liner sheet rests directly on the truck floor which thus comprises the liner bottom bearing. An alternative arrangement shown in FIG. 6 may be employed to permit use of floor liner sheets having a width less than the width of the truck floor. In this arrangement, a backing strip 90 is placed along the junction of side wall and floor, both in front of and to the rear of wheel wells to butt against the edge of the floor liner, and the bottom of the side panel liner rests upon the upper surface of the floor liner. In this case, the floor liner forms the liner bottom bearing.

Figure 7:
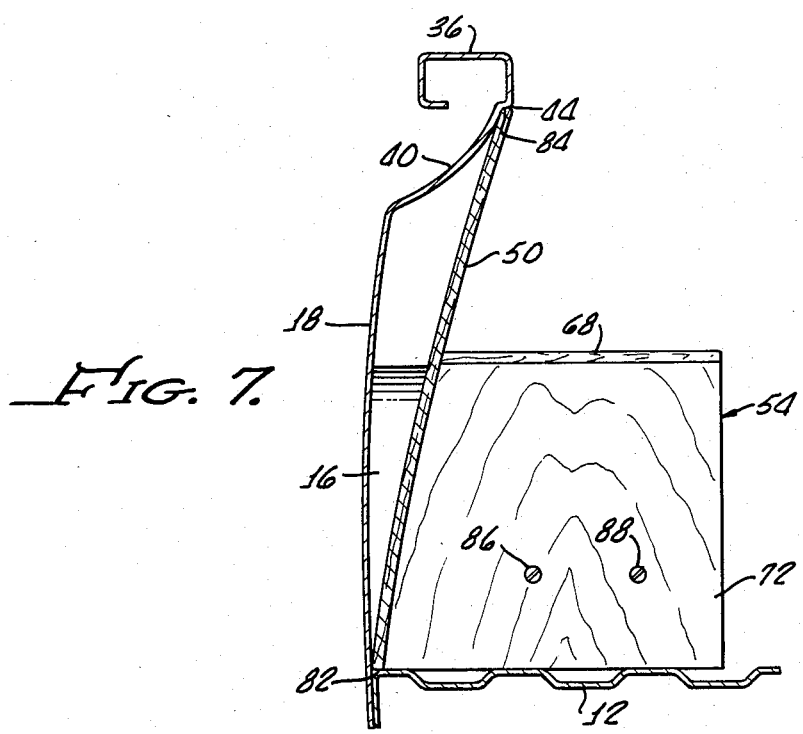

In the arrangement of FIG. 7, no floor liner is used and the truck floor itself forms the liner bottom bearing. In all embodiments, the dimension of the height of the side panel liner sheet allows its upper and lower edges to snugly and forcibly engage shoulder 44 and bottom edge bearing adjacent the truck body floor 12 when the side panel is installed and outwardly bowed, as shown in the drawings. For installation of the side panel liner sheets, the sheets are placed with their lower edges adjacent the floor to side panel junction (either on the floor or on the floor liner) with the upper portion of their front edges captured in the recesses 48 at the forward end of the truck body. An intermediate portion of each side panel liner sheet is then pressed outwardly to the curved configuration illustrated in FIGS. 3, 6 and 7. Preferably, the sheets are pressed outwardly by positioning a wheel well liner box, such as liner box 54, over the wheel well with its outermost edge or edges, or portions of such outermost edges, of wheel well liner elements 68, 72, 74 abutting the inwardly facing surface of the side panel liner sheet. The wheel well liner box is pressed outwardly against the side panel liner sheet, and it is fixedly attached to and covers the wheel well. Pressing the wheel well liner outwardly with its edges abutting the liner sheet 50 bows the liner sheet outwardly and drives its upper and lower edges into close contact with the inward shoulder 44 and the liner bottom bearing. Thus, the side panel sheet is captured and restrained against any upward or downward motion by having its upper and lower edges abutting the shoulder 44 (under the shoulder) and the bottom bearing adjacent the side panel-to-floor junction, with upper edge 84 pressing inwardly against the upper rail shoulder. Furthermore, resilience of the liner sheet, which tends to straighten the liner sheet from its bowed condition, causes the panel to be compressed between the inward shoulder and the bottom bearing, creating pressures on the top and bottom edges which more securely fix the side panel liner sheet in position without any fastening elements.

With the wheel well liner box positioned so as to forcibly bow the side panel liner sheet outwardly, the wheel well liner is then fixed to the wheel well, as by screws or bolts 86, 88, on the rear element 72, and similar screws or bolts on the wheel well liner forward element 74.

After (or before) positioning of the side panel liner sheets and the wheel well liners, the tail box liners are placed over the tail boxes of the truck body tail pieces and bolted, screwed or otherwise affixed to the tail boxes, as by screws 77, 79, with the outermost edges of the tail box liners abutting or engaging the inwardly facing sides of the rear edges of the side panel liner sheets at rear portions of the sheets to hold the side panel liner sheets in position. It is contemplated that for some applications the side panel liner sheets may be held by one or the other, but not both, of the wheel well liner boxes or tail box liners. Use of only the tail box liners enables the side panel liner sheets to be held in place at front and rear ends and thus may adequately secure the liner sheets without use of wheel liner boxes.

Floor liner 60 is formed of one half inch plywood, or equivalent material, cut to fit the floor of the truck body with cutouts for the wheel wells and the tail light boxes, and laid upon the floor prior to installation of the side panel liner sheets and wheel well liners and prior to installation of the tail box liners. The later installed liner elements, especially in the arrangement of FIG. 6, act to hold the floor liner sheet in position without the need for additional fastening elements. Liner sheets 62, 64 for the front wall and tail gate may then be installed by use of conventional screws, bolts, or other connecting devices as may be deemed necessary or desirable.

It will be seen that the curvature of the side panel liner sheets 50, 52, when installed, allows these liner sheets to more closely conform the outwardly bowed curvature of the truck body side panels themselves and also provides for an increase in the space defined between the side panel liner sheets. In addition, the liner curvature provides for an improved appearance, and the bowed configuration of the resilient side panel liner sheets further cooperates with the outward pressure exerted by the bolted in place wheel well liners to provide a simple, but effective, rigid and stable attachment of the liner sheets to the truck body. Some configurations of the side panel upper rail and shoulder may more securely capture the upper edge of the side panel liner sheet. Therefore, the attachment of the side panel liner sheets, merely by capturing the bowed liner sheet between the bottom bearing at the truck floor and the rail inner shoulder and bowing the sheet outwardly may provide sufficiently rigid and secure attachment to the liner, so that no further attachment may be necessary. However, the use of the forward recess 48 and the tail box liners greatly enhance the attachment of the side panel liner sheets.

It will be readily appreciated that means other than the wheel well liner boxes may be employed to press the side panel liner sheets outwardly in their bowed position. Thus, a bracket in the form of a simple angle iron, or the like, may be bolted to the wheel wells at suitable positions to provide the desired outward pressure, or such angle brackets or equivalent devices may be attached to the truck body floor. In such configurations, the wheel well liner boxes may be mounted independently of the side panel liner sheets, or may be omitted entirely.

It will be seen that the unassembled component kit of truck body protective liner elements is readily and inexpensively manufactured of widely available exterior plywood, or equivalent sheet material, with the parts thereof readily subassembled. The wheel well liner boxes and tail piece liners may be preassembled or merely supplied without preassembly, so that the entire protective assembly may be readily shipped, assembled at the truck body location, and installed with a minimum of effort and a minimum of holes, or other connecting devices, formed on the truck body itself. If necessary or desirable, longer parts may be made in separate readily interconnected pieces for convenience of shipping. No holes for bolts, screws or other connecting devices need be made in the single thickness sheet metal side panels or floor of the truck, and yet the side panel protective liner sheet is firmly, securely, and rigidly attached in a configuration causing it to conform to some degree to the curvature of the side panel itself. The entire liner assembly is readily removed for replacement or repair simply by detaching the tail box liners and wheel well liners, if applied, whereupon the floor and side panels may simply be removed, since they are not otherwise secured to the truck body.

In some arrangements, with the sidewall panel sheets outwardly bowed, and their upper and lower edges captured by abutment between the inner shoulder 44 and the bottom support bearing, the securement of the wheel well liner boxes 54, 56 may not be necessary, because the side panels will be held in position and suitably bowed merely by engagement of their forward edges within the recesses 48, and the confinement of the rearmost edges by the tail piece boxes 76, 78. Preferably, the upper edges of the outwardly bowed side panel liner sheets 50, 52 are chamfered, so as to provide a relatively smooth and unbroken surface from the innermost vertical surface of the top rail 36 to the innermost surface of the side panel liner sheet.

Pickup truck bodies are made by different manufacturers may have different details in conjunction of side panels, tail pieces, rails, and the like. Nevertheless, many of such different configurations all include an upper rail, or some other upper edge configuration, having an inwardly positioned and inwardly extending shoulder comparable to shoulder 44, so that a side panel liner sheet may be appropriately dimensioned so as to be bowed outwardly for secure attachment and compression between a bearing at the floor and the shoulder in a manner similar to the arrangement illustrated in FIG. 3.

There has been described a simple, inexpensive, readily installed protective liner assembly for pickup truck bodies in which side panel liner sheets are arranged to be optimumly positioned in conformity with side panel curvature and simply and effectively held in place without any type of direct securing device attached to the side panels.

The foregoing detailed description is to be clearly understood as given by way of illustration and example only, the spirit and scope of this invention being limited solely by the appended claims.

What is claimed is:

1. For use with a pickup truck body having a floor, upstanding sidewalls, and wheel wells, an improved truck body protective assembly comprising
   a side panel liner sheet extending along one of said sidewalls and having a notch fitting over one of said wheel wells, and
   means adapted to be fixedly secured to said one wheel well for pressing an intermediate area of said liner sheet toward said one sidewall,
      said one sidewall of the truck body including an inwardly extending shoulder at an upper portion thereof, said liner sheet adapted to be captured between said shoulder and said floor, said liner sheet having a lower edge adjacent said floor and being bowed outwardly by said means for pressing an intermediate area of said liner sheet.

2. For use with a pickup truck body having a floor, upstanding sidewalls, and wheel wells, an improved truck body protective assembly comprising
   a side panel liner sheet extending along one of said sidewalls and having a notch fitting over one of said wheel wells, and
   means adapted to be fixedly secured to said one wheel well for pressing an intermediate area of said liner sheet toward said one sidewall,
      said one sidewall having a concave inner surface and said means for pressing comprising a liner box covering said one wheel well and fixedly secured thereto, said box having an outer edge positioned to engage said liner sheet to hold the liner sheet in an outwardly bowed position.

3. The method of lining a truck body having a floor, upstanding side panels, including upper rails, and wheel wells, said method comprising
   forming side panel inner sheets for each side panel with cutout portions for receiving a wheel well,
   positioning each liner sheet adjacent a respective one of the truck body side panels with the lower edge of the liner sheet adjacent the junction of the truck body floor and side panel and with the upper edge of the liner sheet adjacent the side panel upper rail,
   pressing a side panel liner sheet holding device against an intermediate portion of the liner sheet to cause it to bow outwardly toward the truck body side panel, and
   securing the holding device to a wheel well of the truck body while it presses the side panel liner sheet outwardly,
      said side panel upper rail including an inwardly projecting shoulder, and including the step of forming each said side panel liner sheet with a height from its bottom edge to its top edge that is greater than the distance for said shoulder to a bottom edge bearing at the junction of said side panel and floor, whereby each side panel liner sheet is outwardly bowed when positioned with its bottom edge adjacent the junction of said truck body floor and side panel and its upper edge under said shoulder.

4. The method of claim 3 including the step of forming said holding device as a box arranged to fit over the wheel well, positioning the box upon the wheel well, pressing the box against the side panel liner sheet to cause the sheet to bow outwardly toward the truck body side panel, and securing the box to the wheel well while it is pressed against the side panel liner sheet.

5. The method of lining a truck body having a floor, upstanding side panels, including upper rails, and wheel wells, said method comprising
   forming side panel liner sheets for each side panel with cutout portions for receiving a wheel well,
   positioning each liner sheet adjacent a respective one of the truck body side panels with the lower edge of the liner sheet adjacent the junction of the truck body floor and side panel and with the upper edge of the liner sheet adjacent the side panel upper rail,
   pressing a side panel liner sheet holding device against an intermediate portion of the liner sheet to cause it to bow outwardly toward the truck body side panel,
   securing the holding device to a wheel well of the truck body while it presses the side panel liner sheet outwardly,
   forming a tail box liner,
   positioning the tail box liner adjacent the rear end of the truck body side panels and against a rear edge of the side panel liner sheet, and
   securing the tail box liner in position.

6. A protective assembly for a pickup truck body having a floor, wheel wells, and upstanding side panels, each side panel having an inwardly extending shoulder at an upper portion thereof, said protective assembly comprising
- a side panel liner sheet having a height slightly greater than the distance from the shoulder of one of said truck body side panels to a bearing at the junction of said panel with the truck body floor, said side panel liner sheet having a cutout for receiving a truck body wheel well and adapted to extend along one of the truck body side panels,
- a wheel well liner box arranged to be placed over and cover a truck body wheel well and including an outer edge portion arranged to displace an intermediate area of the side panel liner sheet outwardly toward a truck body side panel when the wheel well liner box is positioned over a wheel well, whereby the side panel liner sheet may be outwardly bowed and positioned adjacent the truck body side panel and restrained against vertical motion by engagement of its lower edge with the bearing at the junction of the side panel and truck body floor and engagement of its upper edge with the upper shoulder of the side panel, and
- means for fixedly securing the wheel well liner box to a truck body wheel well.

7. The protective assembly of claim 6 wherein said pickup truck body includes a tail box adjacent the rear of the body, and wherein said protective assembly includes a tail box liner arranged to extend around said tail box and engage a rear edge of said side panel liner sheet, and further including means for securing said tail box liner to said tail box of said truck body.

8. The assembly of claim 6 wherein said side panel liner sheet is formed of a resilient material whereby when the sheet is outwardly bowed by engagement with said wheel well liner box, resilience of the sheet tends to straighten the sheet and press its upper and lower edges, respectively, against the side panel shoulder and the truck body floor.

9. The assembly of claim 6 including a floor liner arranged to be positioned on the truck body floor and below the wheel well liner boxes, whereby the wheel well liner boxes retain the truck body floor liner, as well as the side panel liner sheets.

10. In combination with a truck body having a floor, wheel wells, upstanding, outwardly curved side panels, each having an upper rail providing an inwardly projecting shoulder and inwardly extending tail pieces at the rear end of said truck body, an improved protective assembly comprising
- first and second resilient side panel liner sheets extending along respective truck body side panels, each panel having a height slightly greater than the distance between the junction of the truck body side panel and floor and the shoulder of the upper rail of the side panel, each panel being outwardly bowed and positioned with a bottom edge along the junction of floor and side panel and an upper edge pressing upwardly against said upper rail shoulder of the side panel, and
- means for holding respective side panel liner sheets outwardly bowed, whereby resilience of the side panel liner sheets tends to prevent vertical movement of the side panel liner sheet by pressure of the upper and lower eges thereof against the rail shoulder and a bearing at the truck body floor, respectively.

11. The combination of claim 10 wherein said truck body includes a front wall having side edges adjacent front portions of the truck body side panels and forming a rearwardly facing recess therewith, a forward edge of each of said side panel liner sheets being captured within respective ones of said recesses.

12. The apparatus of claim 10 wherein said liner sheets are made of plywood.

13. The apparatus of claim 10 including a tail box liner on each side of said truck body and secured to said truck body tail pieces, respectively, said tail box liners engaging inwardly facing surfaces of the respective side panel liner sheets to hold rear end portions of the sheets in position adjacent the truck body side panel.

* * * * *

UNITED STATES PATENT AND TRADEMARK OFFICE
CERTIFICATE OF CORRECTION

PATENT NO. : 4,505,508
DATED : March 19, 1985
INVENTOR(S) : MARK S. CARTER and JIM RITTER It is certified that error appears in the above-identified patent and that said Letters Patent is hereby corrected as shown below:

In claim 3 (column 6), line 13, "inner" should be — liner —.

Signed and Sealed this

Eighth Day of October 1985

[SEAL]

Attest:

DONALD J. QUIGG

Attesting Officer

Commissioner of Patents and
Trademarks—Designate